(No Model.) 5 Sheets—Sheet 1.

W. HADDOCK.
MACHINE FOR CUTTING MOLDINGS.

No. 380,434. Patented Apr. 3, 1888.

Attest.
L. S. Cotton
Saml C. Cox

Inventor.
Worcester Haddock
per Jno. W. Strehli
Atty.

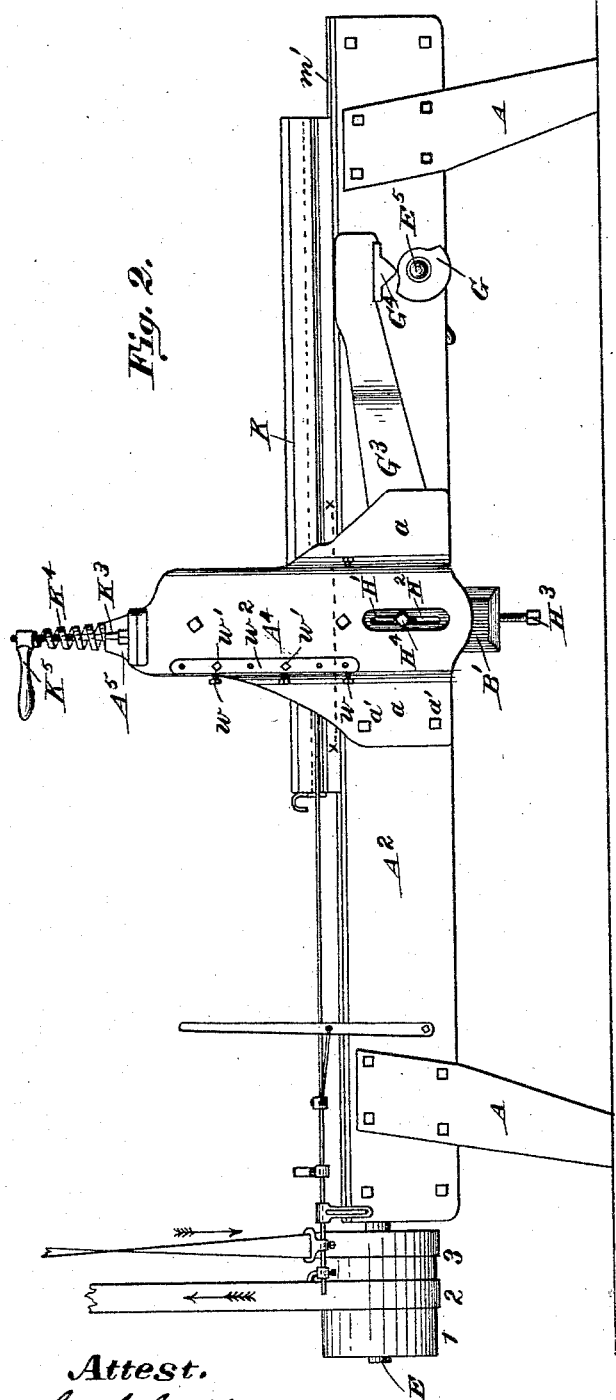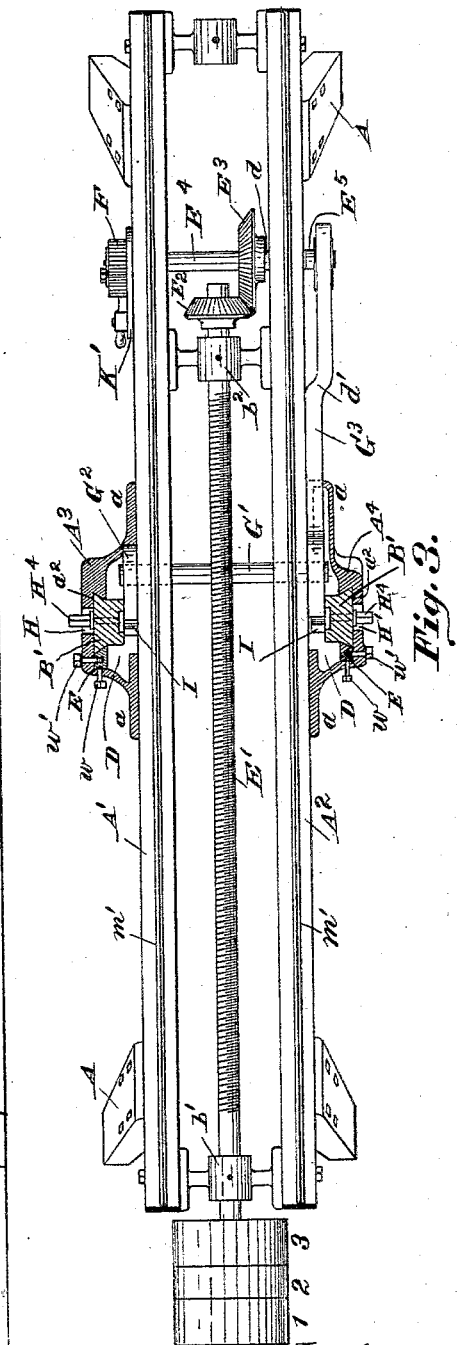

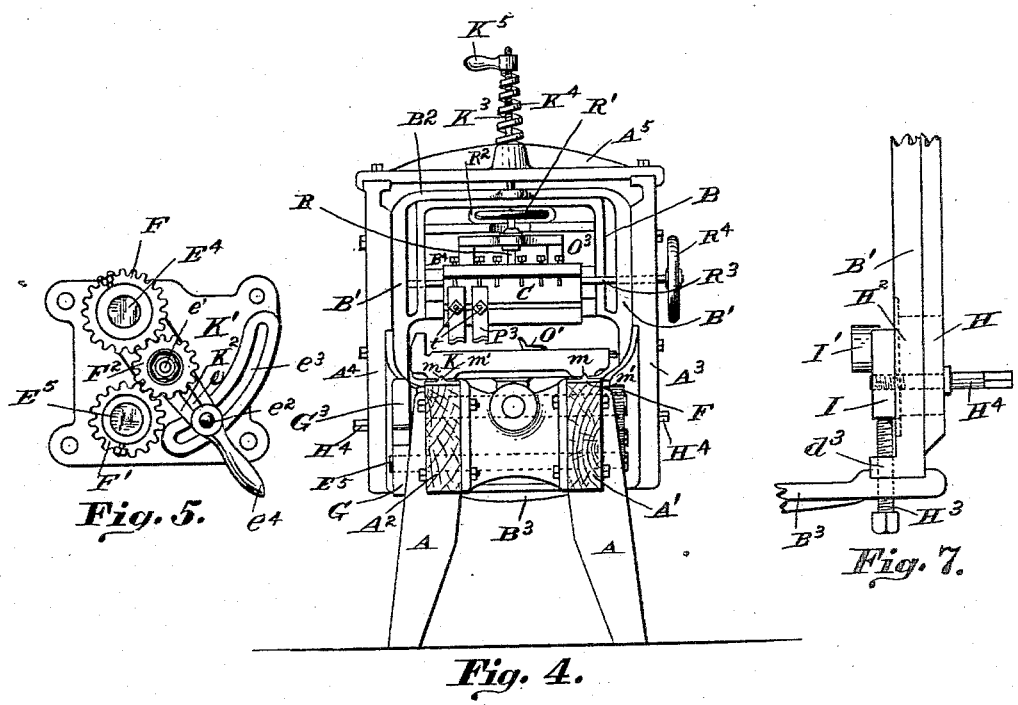

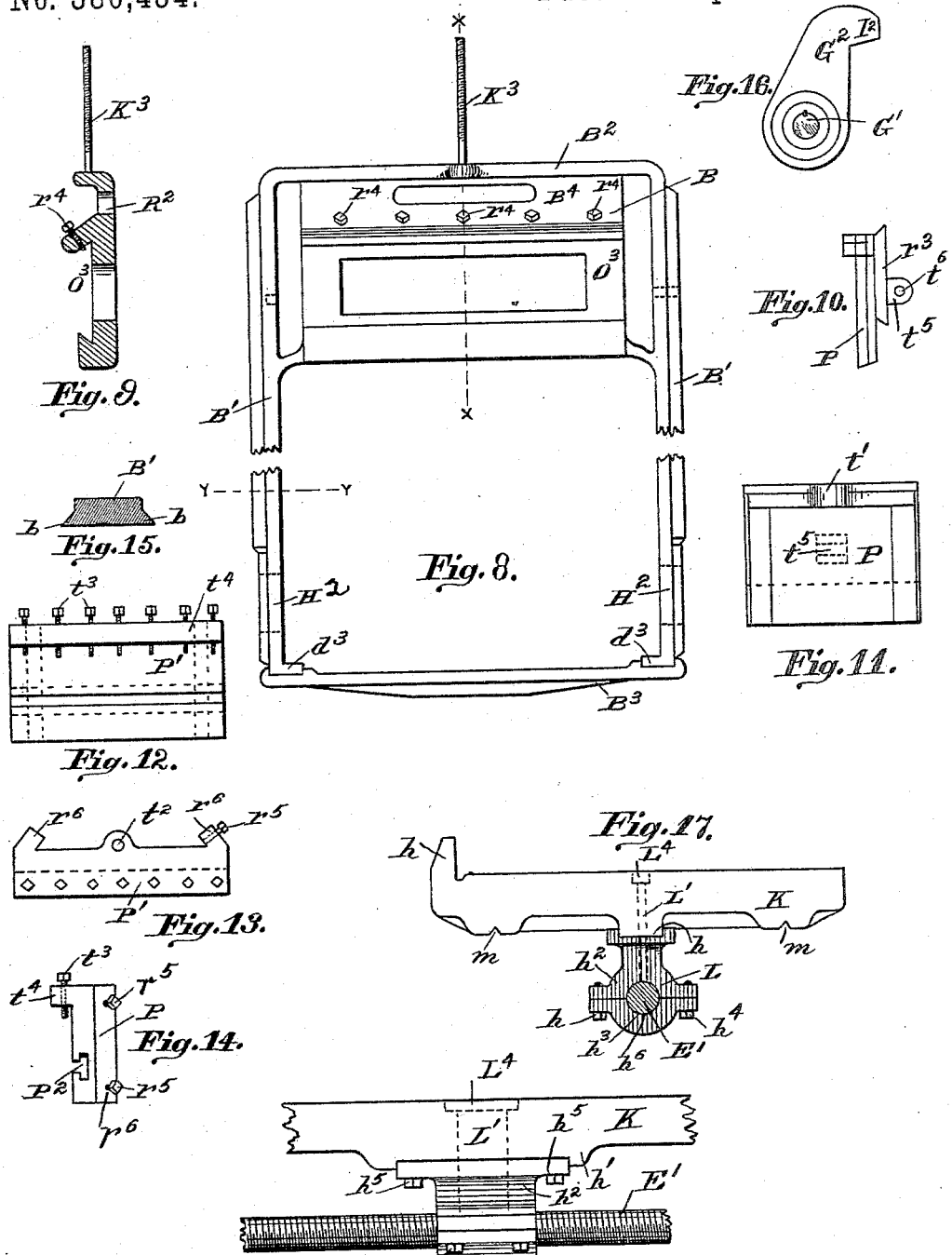

(No Model.) 5 Sheets—Sheet 5.

W. HADDOCK.
MACHINE FOR CUTTING MOLDINGS.

No. 380,434. Patented Apr. 3, 1888.

Attest.
L. S. Cotton
Sam Talcot

Inventor:
Worcester Haddock
per Jno. W. Strehli
Atty.

UNITED STATES PATENT OFFICE.

WORCESTER HADDOCK, OF CINCINNATI, OHIO, ASSIGNOR OF ONE-HALF TO STILLE & DUHLMEIER, OF SAME PLACE.

MACHINE FOR CUTTING MOLDINGS.

SPECIFICATION forming part of Letters Patent No. 380,434, dated April 3, 1888.

Application filed July 6, 1886. Serial No. 207,216. (No model.)

*To all whom it may concern:*

Be it known that I, WORCESTER HADDOCK, a citizen of the United States, residing at the city of Cincinnati, in Hamilton county, and State of Ohio, have invented certain new and useful Improvements in Machines for Cutting Moldings, of which the following is a specification.

The object of my invention is to provide a machine for cutting moldings which can be adjusted to cut moldings of various designs, lengths, widths, and thicknesses.

The various features of my invention, their mode of adjustment, use, and operation will be apparent from the following description.

Figure 1:
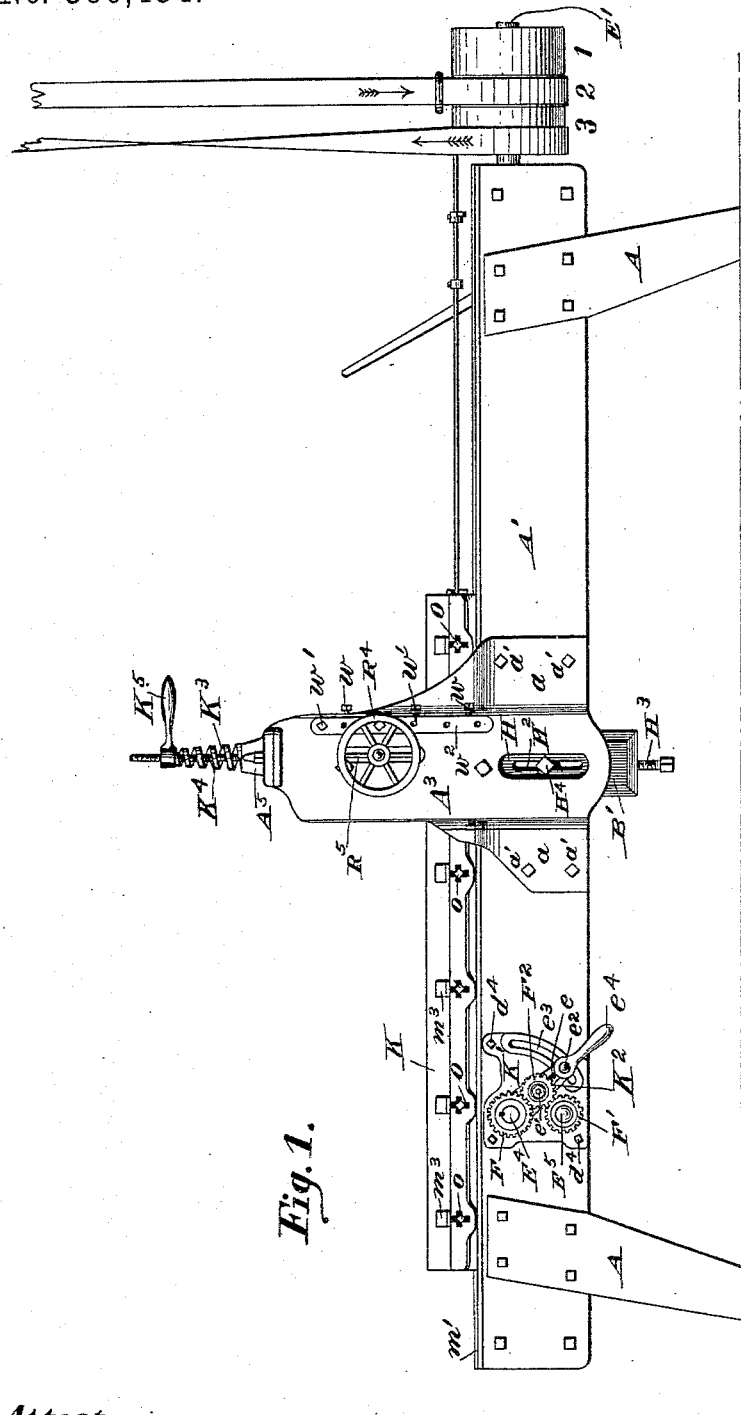
Figure 6:
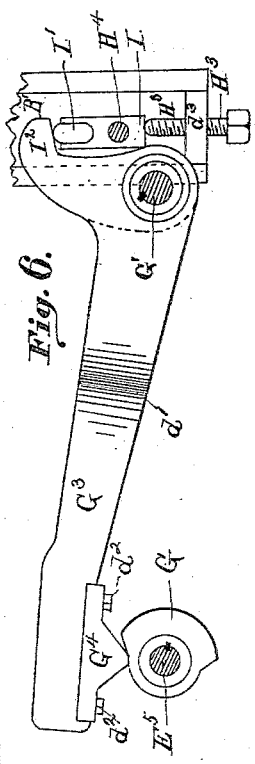

In the accompanying drawings, forming part of this specification, Figure 1 is a side elevation of my machine, (the right-hand side.) Fig. 2 is a side elevation of my machine, (the left-hand side.) Fig. 3 is a top view of my machine, the carriage, cutter-head, and connected parts being removed, the housings, sliding frame, and intervening mechanism being shown in section, taken at the dotted line X X of Fig. 2. Fig. 4 is a front elevation of my machine. Fig. 5 shows the adjustable gear mechanism. Fig. 6 shows in detail the lever or arm, cam, and mechanism for adjusting the machine to cut material of varying thicknesses. Fig. 7 is a side view of the mechanism for adjusting the machine to cut material of varying thicknesses. Fig. 8 illustrates the sliding frame which carries the cutter-head and connected parts in elevation, the mechanism for adjusting the machine to cut material of varying thicknesses also being shown. Fig. 9 is a cross-section taken at the line X X of Fig. 8. Fig. 10 is an end view of the back plate of the cutter-head. Fig. 11 is a front view of the back plate of the cutter-head. Fig. 12 is a front view of the knife-carrying plate of the cutter-head. Fig. 13 is a top view of the same. Fig. 14 is an end view of the same. Fig. 15 is a cross-section taken at the line Y Y of Fig. 8, showing shape of the side of the sliding frame. Fig. 16 is a side view of short arm $G^2$ on the right-hand side of the machine, that acts in conjunction with the arm or lever $G^3$ on the left-hand side of the machine. Fig. 17 is an end view of the carriage, showing its shape and the hanger on the bottom of the carriage, through which the feed-screw works which operates the carriage, also showing the means for lubricating the connection between the carriage and feed-screw. Fig. 18 is a side view of said mechanism. Figs. 19, 20, 21, 22, and 23 represent specimens of some of the various moldings cut on my machine, the parts X of said figures showing an end view of such moldings.

The frame-work of the machine consists, principally, of the side pieces, $A'$ $A^2$, the housings $A^3$ $A^4$, and the top plate, $A^5$, which connects said housings at the top. This frame-work is supported on the legs A, but may be supported in any other desired manner. The housings $A^3$ $A^4$ are cast and have the wings $a$ $a$ on each side, and by means of bolt-connections $a'$ $a'$ are fastened to the side pieces, $A'$ $A^2$.

B represents the sliding frame, which carries the cutter-head C. It is composed of the sides $B'$ $B'$, top $B^2$, bottom plate, $B^3$, and back $B^4$. (See Fig. 8.) The housings $A^3$ $A^4$ are cast so as to form a space, D, to allow the sliding frame B and its adjusting mechanism to slide or work vertically therein. Preferably a V-shaped groove, $a^2$, is present in the housings $A^3$ $A^4$, the gib E, (which will be described hereinafter,) when in position, forming, in connection with the side of the housing, another V-shaped groove on the opposite side of the housing. (See Fig. 3.)

The sides $B'$ $B'$ of the sliding frame B are formed with the corners or ridges $b$ $b$, (see Fig. 15,) preferably V-shaped, thus forming, in connection with the V-shaped groove $a^2$, a dovetail sliding connection, the sliding frame B, carrying the cutter-head C, working or sliding vertically in the space D, the corners or ridges $b$ $b$ of the sides $B'$ $B'$ fitting or projecting into the V-shaped grooves $a^2$ in the housings. These sides $B'$ $B'$ may be of any other desirable form or shape.

$E'$ represents the feed screw or shaft, carrying at its rear end the pulleys 1 2 3, passing through journal-bearings $b'$ $b^2$, and carrying at its forward end the bevel gear-wheel $E^2$. This bevel-gear $E^2$ meshes with the larger bevel gear-wheel, $E^3$, on the cross or gear shaft $E^4$. This shaft $E^4$ is journaled in the side piece A² at $d$, passes through and is journaled in the side piece A', and on its outer end has suitably keyed or fastened to it the gear-wheel F. Directly below the gear-shaft E⁴ is the cross or cam shaft E⁵, which is journaled in the sides A' A², having at one end suitably keyed or fastened on it the cam G and at the opposite end suitably keyed or fastened on it the gear-wheel F'.

G' represents a rock-shaft which is journaled in the side pieces, A' A², as shown in Fig. 3. This rock-shaft G' at the right-hand side supports and imparts motion to the short arm G². At the left-hand side it supports the long arm or lever G³. This long arm G³ is slightly bent outward at $d'$ in order to properly meet the cam G. To the arm G³ at its forward end is attached by screws $d^2$ $d^2$ the V-shaped piece G⁴. The arm G³ is of peculiar shape. (See Fig. 6.) One of the wings $a$ is cut away sufficiently to allow the long arm to work. The short arm G² is similar in shape to the rear end portion of the arm or lever G³, as shown by dotted lines in Fig. 6.

In the housings A³ and A⁴, respectively, are cut the slots H and H', and in the sides B' B' of the sliding frame B are cut the slots H². These slots are present to allow for the adjustment of the block I and to allow for play of the screws H⁴.

The sides B' B' of the sliding frame B are provided with the feet or inwardly-projecting flanges $d^3$, through which and the bottom plate, B³, pass the adjustment-screws H³. Through the slots H H' H² pass the screws H⁴, which hold the bearing block or piece I in position. This bearing I is provided with the oblong boss or knob I', rounded at its ends. This bearing block or piece I rests on the adjusting-screw H³. On the top rounded surface of the boss or knob I' of the bearing-piece I rests or bears the head or projected part I² of both the long and short arms G³ and G².

By turning the adjustment-screws H³ in the proper direction the sliding frame B, carrying the cutter-head C, is moved up or down, thus allowing material of different thicknesses to pass between the knives and the carriage K. This adjustment is made by first unscrewing the screw H⁴. This releases the block I, which can then be lowered or raised by properly turning the screw H³. The block I is then secured by the screw H⁴ being screwed into place in said block I. If the frame B is lowered, the spring K⁴ relaxes slightly and the frame B, carrying the cutter-head, is lowered, and if raised the spring K⁴ draws up the frame B.

The plate K' is attached to the side A' by bolts $d^4$, as shown. The shafts E⁴ and E⁵, carrying, respectively, the gear-wheels F and F', pass through this plate, and said gear-wheels are adjustably secured on said shafts. The adjustable yoke K² contains the slot $e$ and passes around the shaft E⁴ back of gear-wheel F. The gear-wheel F² is adjustably secured in the slot $e$ of the yoke K² in any desirable manner or at any point or place. The lower end of the yoke K², (which carries the adjustable gear-wheel F²,) is secured at any point in the slot $e^3$ by turning the handle $e^4$ in the proper direction, which serves as a nut for securing the same by a bolt which passes through slot $e^3$ and yoke K². The spur gear-wheels F, F', and F² being adjustable, larger or smaller gear-wheels may be substituted in their place; also, cams of different shapes and patterns than the cam G may be substituted.

By changing the spur gear-wheels so as to differ the speed or time of shaft E⁵, which carries cam G, increases or diminishes the time or motion of arms G³ and G² and of the rock-shaft G' and gives the required vertical motion to the sliding frame B.

Extending upwardly from the top of the sliding frame B through the top plate, A⁵, is the screw K³, around which is coiled the spring K⁴. This spring K⁴ is held in position and its tension regulated by turning the handle K⁵. The carriage K, made in any desired shape, has on its left side the ridge or rib $h$, against which the material to be cut is clamped. Under the carriage K, near its rear end, the projection $h'$ is present.

L represents a hanger composed of the parts $h^2$ and $h^3$, fastened together by the bolt-connection $h^4$. The upper part, $h^2$, is recessed to receive the projection $h'$ of the carriage K and is fastened to the carriage by the screws $h^5$. These parts $h^2$ and $h^3$ are so formed that when put together they form the opening $h^6$, through which the feed-screw E' works. The opening $h^6$ has a female screw-thread, and the feed screw or shaft E', passing through it, fits said female screw-thread and imparts motion to the carriage K, and the V-shaped grooves $m$ in the carriage K, fitting on the V-shaped rails $m'$, allow the carriage to travel or slide forward and backward on said rails $m'$.

In the carriage K and upper part, $h^2$, of the hanger L is formed the lubricating-chamber L', which lubricates the feed-screw and connected parts. This chamber L' is covered by the cap L⁴. The work is clamped to the carriage K by any suitable means, preferably as shown.

The cutter-head is constructed as follows: The back B⁴ of the sliding frame B is constructed with the dovetail groove O³, into which is slid the back plate, P, (shown in Figs. 9, 10, and 11,) the part $r^3$ fitting the dovetail groove O³, and is held in position by the screws $r^4$. On this plate P fits the knife-carrying plate P', being dovetailed therein, the plate P' being held in position by the screws $r^5$, passing through the wings $r^6$ of the said knife-carrying plate P'. In the knife-carrying plate P' is the T-shaped slot P², into which the T-shaped lug on the end of the bolt which passes through the cutting-knives P³ is slipped, and by screwing on the nut $t$ the knives are held in position. Through the hole $t'$ in the back plate, P, and through the hole $t^2$ in the knife-carrying plate P' passes the screw R, carrying the hand-wheel R', the screw R being collared in the plate P. By turning the hand-wheel R the plates P and P', with the knives P³, are either lowered or elevated, as desired. The slot R² is cut in the back B⁴ to allow the wheel R to be turned. The screws t³, passing through the ledge t⁴ on the plate P', prevent the knives from sliding up.

Cast on the plate P is the lug t⁵, in which is the hole t⁶. The screw R³, having the hand-wheel R⁴, passes through the slot R⁵ in the housing A³, then through the side B' of the sliding frame B, then through the hole t⁶ in the lug t⁵ on plate P, and is journaled in the side B' of the sliding frame B. This screw is collared in the plate P. By turning the hand-wheel R⁴ in the proper direction the plates P and P', carrying the knives P³, slide in the dovetail groove O³ to the right or left, thus making it possible to adjust the knives laterally and bring them over the material to be cut on the carriage K. The gib E, of suitable construction, is provided to take up any lost motion. The screws w, passing through the sides of the housing, are for its adjustment, and the screws w', passing through the housing and strip w², are to lock it in position. The gib E may be made of any desired length.

The reverse motion is given to the machine by the device shown in Fig. 2, similar to the device in use in planers and various other machines.

My machine operates as follows: The material to be cut is placed on the carriage K and held in position by clamping it with the clamping-jaws O'. The proper knives to suit the molding to be cut are adjusted in the cutter-head C. Power is then applied and the machine started. The feed screw or shaft E', revolving, communicates motion to the carriage K by turning in the female screw in the hanger L, and the carriage K moves forward and backward on the rails m', carrying the material to be cut under the cutter-head. The bevel gear-wheel E² on the end of the feed-screw E' meshes with and communicates motion to the bevel-gear E³ on the cross or gear shaft E⁴, and the gear-wheel F, revolving on the said shaft E⁴, communicates motion to the gear-wheels F' and F², thus revolving the cam-shaft E⁵ and communicating motion to and revolving the cam G. The V-shaped piece G⁴ on the long arm or lever G³ travels over the face of the cam G. When traveling the lean portion of the cam, the sliding frame B, and the cutter-head are up from the material or work; but as soon as the portion G⁴ of the arm G³ travels over the lift or throw of the cam the forward portion of the arm is elevated and the rear portion of the arm has a downward motion, and in moving downward communicates motion to the rock-shaft G', which in turn communicates motion to the short arm G², thus simultaneously pressing the head I² of both the long and short arm G³ G² on the boss or knob I' of the bearing block or piece I, which pressing or downward motion forces the sliding frame B downward and brings the knives in contact with the material on the carriage K (which is now moving with the material upon it) and causes them to operate on the material. By this time the lean portion of the cam is again being traveled, and the spring K⁴ and the turning of the rock-shaft G' lift or elevate the sliding frame B up from the work, and as soon as the throw or lift of the cam is again traveled by the arm or lever G³ the sliding frame again moves downward and the knives make another cut. The hand-wheel R' is slightly turned to bring the knives closer to the work or material as it is being cut deeper. This operation is continued until the material is cut as desired, the sliding frame B alternately moving or sliding down and carrying the knives to the work, or moving or sliding up and taking the knives from the work, the carriage K all the while traveling forward and backward at the same speed. The down-and-up motion or travel of the sliding frame is vertical.

Figure 19:
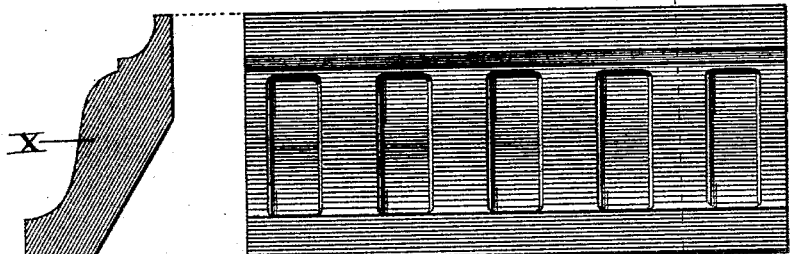
Figures 20, 21, 22:
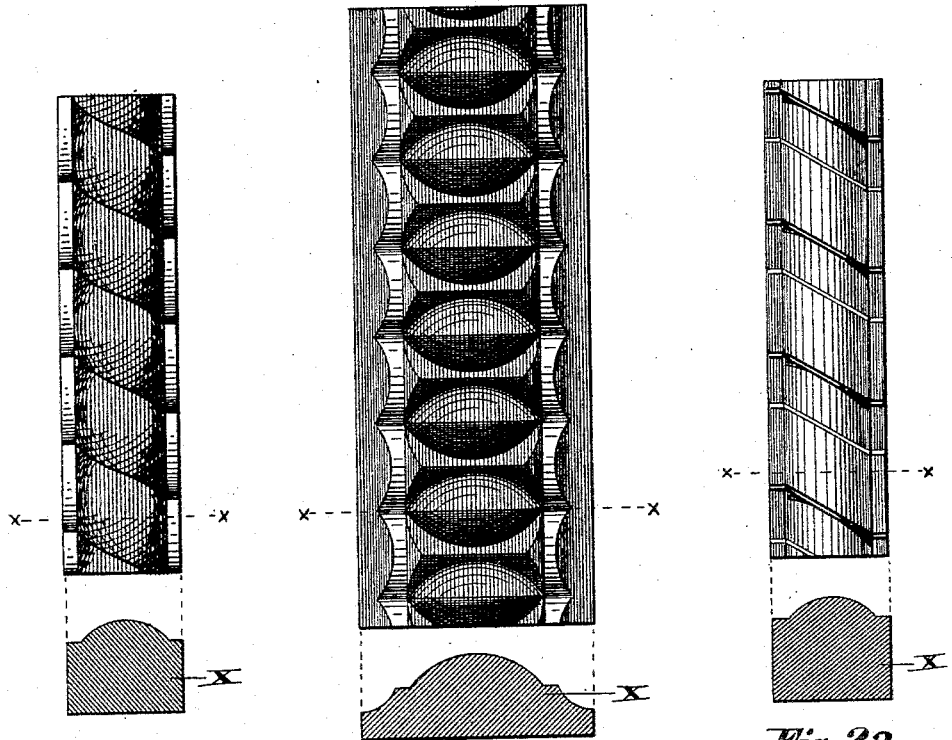
Figure 23:
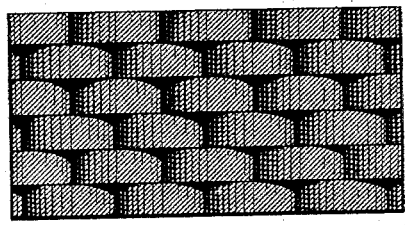

With the cam and gear as illustrated in the drawings a molding such as illustrated in Fig. 19 is cut.

By using cams of different shapes or patterns and substituting gear-wheels of different sizes for the wheels F F' F² the downward-and-upward motion of the sliding frame B is increased or diminished to adapt the machine to cut moldings of different designs, but the speed of the carriage K is unchanged.

Features of my invention may be employed in connection with machines for cutting moldings other than the one herein set forth.

What I claim as new and of my invention, and desire to secure by Letters Patent, is—

1. In a machine for cutting moldings, housings connected to the frame-work and having vertically-slotted side walls, a sliding frame, cutter-head attached thereto, adjusting-screws for vertically adjusting the sliding frame, arm G², and lever G³, substantially as set forth.

2. In a machine for cutting moldings, housings connected to the frame-work and having vertically-slotted side walls, a sliding frame, cutter-head attached thereto, bearing-block I, screw H⁴, connecting the same to the frame and holding it in position, and adjustment-screws H³, bearing and operating against said block I to secure the vertical adjustment of the sliding frame, substantially as and for the purpose set forth.

3. In a machine for cutting moldings, housings connected to the frame-work and having vertically-slotted side walls, a sliding frame, cutter-head attached thereto, bearing-block I, screw H⁴, connecting the same to the frame and holding it in position, adjustment-screws H³, bearing and operating against said block I to secure the vertical adjustment of the sliding frame, a carriage, K, having depending projection h', two-part hanger having recessed upper portion to receive the projection $h'$ on the carriage, and a screw-threaded socket, a feed-screw engaging in said screw-threaded socket, and suitable means for actuating said feed-screw, substantially as set forth.

4. In combination with the sliding frame carrying the cutter-head, the bearing-block connected with said frame and having a knob or boss, $I'$, having a rounded upper surface, the short arm $G^2$ and lever $G^3$, having hook-shaped ends to rest upon the bearing-block boss $I'$, cam-shaft $E^5$, cam $G$ thereon, projection $G^4$, depending from said long lever $G^3$ and engaging with the cam $G$, and rock-shaft $G'$, connecting said arm $G^2$ and lever $G^3$ and supporting and imparting motion to said arm $G^2$, substantially as and for the purpose set forth.

5. In combination with a sliding frame carrying the cutter-head, a bearing-block connected with said frame and having a knob or boss, $I'$, having a rounded upper surface, the arm $G^2$ and lever $G^3$, having hook-shaped ends to rest upon the bearing-block boss $I'$, cam-shaft $E^5$, cam $G$ thereon, projection $G^4$, depending from said lever $G^3$ and engaging with the cam $G$, rock-shaft $G'$, connecting said arm $G^2$ and lever $G^3$ and supporting and imparting motion to the arm $G^2$, the carriage $K$, having depending hanger $L$, constructed substantially as described, feed-screw, actuating devices connected to one end thereof, a cross-shaft, $E^4$, bevel-wheels connecting said feed-screw and shaft $E^4$, yoke $K^2$, and a series of adjustable and interchangeable gears mounted on said cross and cam shafts and within the yoke $K^2$, respectively, substantially as and for the purpose set forth.

6. In a machine for cutting moldings, the combination of the sliding frame B, carriage K, rock-shaft $G'$, arms $G^3$ $G^2$, cam G, and mechanism for operating the same, and the adjustable bearing block or piece I, substantially as and for the purpose set forth.

7. In a machine for cutting moldings, the combination of the sliding frame B, carriage K, rock-shaft $G'$, arms $G^3$ $G^2$, cam G, adjustable bearing block or piece I, and adjusting-screw $H^3$, substantially as and for the purposes set forth.

8. In a machine for cutting moldings, the combination, with the sliding cutter-head frame, of a bearing-block having a boss provided with a rounded upper edge, a screw holding said block in connection with the cutter-head frame, a short and a long armed lever, each supported on suitable rock-shafts and having hook-shaped ends to engage with the curved boss on the bearing-block, and a cam adapted to operate said levers, substantially as and for the purpose set forth.

WORCESTER HADDOCK.

Attest:
C. W. BOGART,
C. W. EARNIST.